United States Patent [19]

Turner

[11] Patent Number: 4,672,747

[45] Date of Patent: Jun. 16, 1987

[54] MAGNETIC DEVICE FOR AIDING SCALED REPRODUCTION OF PICTORIAL IMAGES IN NEEDLEWORK

[76] Inventor: Eleanor Turner, 4348 Palo Verde, Lakewood, Calif. 90713

[21] Appl. No.: 806,486

[22] Filed: Dec. 9, 1985

[51] Int. Cl.[4] .................................. G01B 3/00

[52] U.S. Cl. .................................. 33/1 K; 33/DIG. 9

[58] Field of Search ............ 33/1 K, DIG. 1, DIG. 9

[56] References Cited

U.S. PATENT DOCUMENTS

| | | | |
|---|---|---|---|
| 2,822,736 | 2/1958 | Padgett | 33/DIG. 1 |
| 2,848,923 | 8/1958 | Diefenbach | 33/DIG. 9 |
| 3,746,992 | 7/1973 | Serembe | 33/DIG. 1 |
| 3,949,629 | 4/1976 | Johnson | 33/DIG. 1 |
| 4,102,050 | 7/1978 | Roth | 33/DIG. 1 |
| 4,267,656 | 5/1981 | Solomon | 33/DIG. 1 |
| 4,426,789 | 1/1984 | Goodrich | 33/DIG. 9 |

FOREIGN PATENT DOCUMENTS

| | | | |
|---|---|---|---|
| 113082 | 1/1945 | Switzerland | 33/DIG. 9 |

*Primary Examiner*—Willis Little

*Attorney, Agent, or Firm*—Charles H. Thomas

[57] ABSTRACT

A needlework guide includes a sheet steel backing and a sheet steel frame defining a central, rectangular window therein. A picture to be produced in needlework is positioned on the backing. The picture is either superimposed on graph paper or a transparent overlay with a rectilinear grid thereon is positioned thereover. Magnetic strips hold the frame to the backing with the picture and any transparent overlay sandwiched therebetween. Vertical scales are positioned along opposite sides of the window with graduations equal to the spacing of the rectilinear grid and with numbers corresponding to the weft row to be woven. A horizontal scale also has graduations spaced at the same interval and duplicate sets of numbers ascending in both directions from the center of the scale. The numbers on the horizontal scale correspond to the warp yarns to be woven. Different colors of yarns are woven in correspondence with the colors on the image mounted between the frame and the backing. Stitches are woven in needlework at locations corresponding to matrix coordinates in the image as defined by the vertical and horizontal scales.

14 Claims, 8 Drawing Figures

MAGNETIC DEVICE FOR AIDING SCALED REPRODUCTION OF PICTORIAL IMAGES IN NEEDLEWORK

BACKGROUND OF THE INVENTION

1. Field Of The Invention

The present invention relates to a needlework guide which aids in the scaled reproduction of pictorial images in needlework. Such images may be reproduced in needlework from drawings or photographs, for example.

2. Description Of The Prior Art

The present invention is a device useful in the sewing craft arts, such as weaving, embroidering, crocheting, cross-stitching, lace darning, candle wicking, needlepoint and needlepunch using either thread or yarn, rug needlepunch, hooking rugs, tapestry, quilting designs, machine and hand knitting, such as intarsia knitting with bobbins, as well as in other artistic endeavors, such as oil and water paintings, model building, stencil designing, air brush designing, floor designing and tiling, landscaping and other creative arts in which pictorial images in one medium are reproduced in a different medium.

In the sewing arts, pictorial images may be reproduced in needlework by first drawing the picture to be copied on graph paper. The sewing artisan then may reproduce the image from the picture in different colors of yarn by counting spaces on the graph paper corresponding to the yarn color desired, and weaving the weft yarn strands into the warp yarn strands at a location and for a number of stitches corresponding to the location and number of graph paper squares of that color in the picture to be reproduced. According to this technique, an individual must tediously count graph paper squares and concentrate closely on sewing in a corresponding number of stitches with yarn. Any momentary interruption with even a brief lapse in concentration necessitates recounting of the graph paper squares and the corresponding yarn stitches. Consequently, a great deal of time and effort in reproducing a pictorial image in needlework is devoted to counting and recounting graph paper squares and needlework stitches. A further difficulty in the conventional reproduction of pictorial images in needlework is that if the scale of the graph paper chosen is initially too large or too small, the picture must be completely redrawn on different graph paper having squares of a more appropriate scale in order to fashion an image of desired size in needlework.

SUMMARY OF THE INVENTION

The present invention is a magnetic scaling device which is employed to aid one in creating aesthetically pleasing images, pictures or designs on a two dimensional medium using a two dimensional model bearing the image in a different medium. The invention has particular utility to the sewing craft arts.

The magnetic image scaling device of the invention employs a thin, magnetic backing, typically constructed in a rectangular shape, and a magnetic frame which fits on top of the backing. The frame is preferably congruent to the backing and both the frame and backing are preferably constructed of sheet steel and formed in a rectangular shape. The frame defines a rectangular window at its center. Rectangular magnetized strips are interposed between the frame and the backing and serve to hold the frame pressed against the backing using the force of magnetism.

A picture, such as a drawing on paper, serves as a two dimensional model which is to be reproduced in needlework. The picture may be drawn on rectilinear graph paper, if desired. A drawing on graph paper is not necessary, however, according to the system of the invention. Photographs, emblems, prints, designs on fabrics, and any other visual image on any flat, two dimensional medium may be employed as a model. In all situations where the pictorial image to be reproduced is not drawn on graph paper, a transparent overlay having a rectilinear grid thereon is laid on top of the pictorial model. The model, together with the overlay, are then entrapped between the frame and the backing with the model clearly visible through the transparent overlay and through the window in the frame.

Sets of linear ordinate and abscissa scales are provided and include graduations spaced uniformly apart at the same interval of separation as the rectilinear grid on the transparent overlay or as on the graph paper grid upon which the model may be drawn. Each scale includes indicia, such as numbers, which correspond to the spatial separations in the rectilinear grid of the model. Preferably, a pair of vertical or ordinate scales are provided on opposite sides of the pictorial model at the edges of the window. The ordinate scales are preferably numbered sequentially in opposite directions. That is, one ordinate scale is preferably numbered in ascending incremental units from top to bottom, while the other is numbered in the same incremental units ascending from bottom to top. The abscissa scale is positioned orthogonally across the frame relative to the ordinate scale. Preferably the abscissa scale includes a central marking and is numbered laterally in both directions with numbers ascending from the center in mirror image numerical sequences. The intervals of separation of the graduations to the abscissa, or horizontal scale, likewise correspond to the intervals of separation of lines in the rectilinear grid of the model. The abscissa scale thereby defines the horizontal distance from a vertical centerline in terms of numbers of the selected incremental units.

All of the scales of the needlework aid may be backed by magnetic strips so that they will be held in position against the steel frame and backing by the force of magnetic attraction. The ordinate and abscissa (vertical and horizontal) scales thus define a rectilinear grid in which each square is numbered horizontally to either side of a center, and vertically from one end of the model to be reproduced to the other.

Preferably, also a pair of brackets or clips are provided to hold the abscissa scale in position relative to the ordinate scales. While the ordinate scales are not moved during the reproduction of the model in needlework, the abscissa scale is moved longitudinally relative to the ordinate scales. The clips are positioned outside of the ordinate scales on the lateral edges of the frame and hold the abscissa scale on both sides of the center marker at opposite ends of the scale. The clips may be moved vertically together relative to the model to position the abscissa scale at a vertical position relative to the model to be reproduced so as to maintain the abscissa scale at a position relative to the ordinate scales which corresponds to the current work position of weft strands being worked along the warp strands in the needlework piece.

Preferably the clips are equipped with magnets and may thereby be releasably secured to the steel frame by the force of magnetic attraction at a selected level relative to the vertical or ordinate scale. Thus, as the reproduction of the image of the model in needlework proceeds along the warp strands, the horizontal scale may be moved longitudinally relative to the vertical scale so as to hold the horizontal scale proximate to the next sequential weft strand to be woven.

Using the device of the invention, one is able to create a reproduction of a picture or design mounted within the frame on the backing in a different medium. For example, a reproduction of the model in yarn can be produced on a knitting machine when the model is mounted in the device of the invention, which serves as a needlework guide. This type of knitting is called "intarsia" knitting.

To use the invention for knitting, the user may begin either at the top or at the bottom of the model. In conventional knitting machines, the knitting needles are arranged in a horizontal file and are numbered in duplicate, mirror image sequences of numbers, both to the right and to the left of center. The position of each knitting needle corresponds to a position to the right and left of center on the model, in correspondence with the graduations and indicia on the abscissa scale in the device of the invention. Thus, the appropriate thread color for the weft, or horizontal yarn row involved, is laid across and knitted by means of each knitting needle. The needlwork guide of the invention provides a ready reference which eliminates the tedious and repetitious counting and recounting of graph paper squares and the corresponding counting and recounting of knitted stitches and rows. To the contrary, the rectilinear grid in the needlework guide of the invention includes squares which are clearly labeled by the scales of the invention. Thus, for example, if black yarn is to appear on a particular horizontal row of stitches between the positions from the numbers 13 and 19 to the left of center on the rectilinear grid associated with the model, the corresponding knitting needle numbers 13 through 19 are equipped with black yarn. Likewise, the appropriate yarn for the other knitting needles can be readily ascertained by merely looking at the horizontal, or abscissa scale.

As the pictorial image is reproduced by knitting in sequential, weft rows, the clips holding the abscissa scale are moved together longitudinally along the ordinate scales on the frame of the device of the invention. The abscissa scale carried in the clips is thereby moved to the proper ordinate, or vertical position of the abscissa or horizontal row that is currently being knitted in the needlework.

The primary purpose of the device of the invention is to eliminate the tedious counting and recounting of graph paper square associated with a model. Rather, the squares in the rectilinear grid upon which the model is drawn, or which is superimposed upon the model, remain labeled throughout the knitting process. The labels are the indicia on the ordinate and abscissa scales. The scales are held by magnetic attraction to the backing or frame, and the frame is held to the backing by the force of magnetic attraction so as to hold the model immobile.

In certain sewing crafts, corresponding scales can be provided on a rectangular frame holding a workpiece. For example, in needlepoint work needlepoint stitches are sewn into a fabric screen. The apertures in the fabric screen correspond to the graph paper squares. Accordingly, ordinate and abscissa scales may be mounted on the needlepoint frame in correspondence to the ordinate and abscissa scales on the device of the invention. The ratio of the size of the unit increments of the scales mounted on the needlepoint frame to the unit increments of the rectilinear grid associated with the model determines the relative size of the reproduction of the model in needlepoint to the size of the model itself. That is, if the reproduction of the model is to be sewn twice as large as the model, the increments of the scales on the needlepoint frame will be twice the size of the increments on the rectilinear grid associated with the model.

In one broad aspect the invention may be considered to be a device for facilitating the reproduction of a pictorial image in needlework. According to the invention, a flat, magnetic sheet forms a backing for an image to be reproduced. A flat, magnetic frame includes a border which defines a central, rectangular window therewithin. Magnet means for releasably holding the frame on the backing is provided. Also, there is at least one vertical scale adapted for mounting at a side of the window. The vertical scale contains graduations spaced uniformly apart at a desired scale of image reproduction in needlework. At least one horizontal scale is provided having a center marker and mirror image sets of graduations. The graduations in the horizontal scale are at the same desired scale of reproduction in needlework, and ascend in both directions from a center marker in the horizontal scale.

The frame and the backing sheet are both magnetic. That is, they are both formed of material having the properties of a magnet in that they are either magnetized or capable of being magnetized or attracted by a magnet. The force of magnetism presses the frame and backing together with the picture bearing the image to be produced captured therebetween.

The utility of the invention is enhanced considerably when a plurality of sets of vertical and horizontal scales are provided and when a transparent overlay is provided for each set of scales. The graduations on the scales in each set are spaced apart at uniform intervals, and the rectilinear grid in the transparent overlay associated therewith is formed of orthogonal lines spaced at the same uniform interval as the graduations in the set of scales associated therewith. The graduations in different sets of scales are separated from each other by different spaced intervals. Accordingly, the size at which the pictorial model is to reproduced can be selected by employing the appropriate set of scales and the transparent overlay associated therewith.

In a preferred embodiment of the invention, each set of scales includes a pair of vertical or ordinate scales. The graduations on the ordinate scale in each pair are uniformly separated, and both ordinate scales include indicia thereon. The indicia on one of the ordinate scales in each pair increase in a direction opposite to the direction of increase of the indicia in the other vertical scale in the pair. That is, in each vertical pair of scales one scale is numbered from top to bottom while the other scale is numbered from bottom to top. The artisan is thus provided with coordinate positions of the features of the model in proceeding with the completion of the needlework in either direction along the wharp strands.

The invention may be described with greater clarity and particularity by reference to the accompanying drawings.

IN THE DRAWINGS

DESCRIPTION OF THE EMBODIMENT

Figure 1:
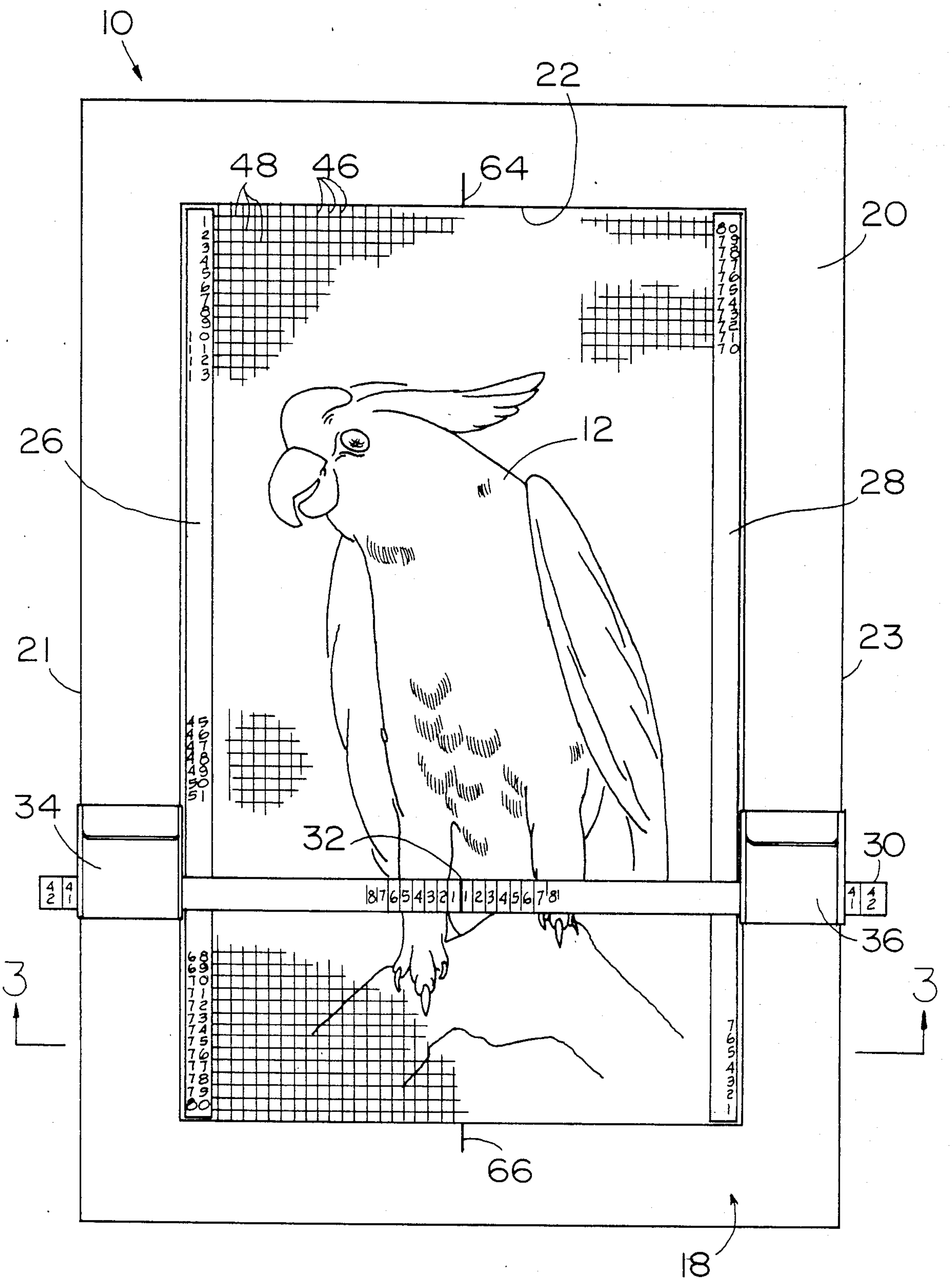
FIG. 1 is a front elevational view illustrating a preferred embodiment of the invention.
Figure 2:
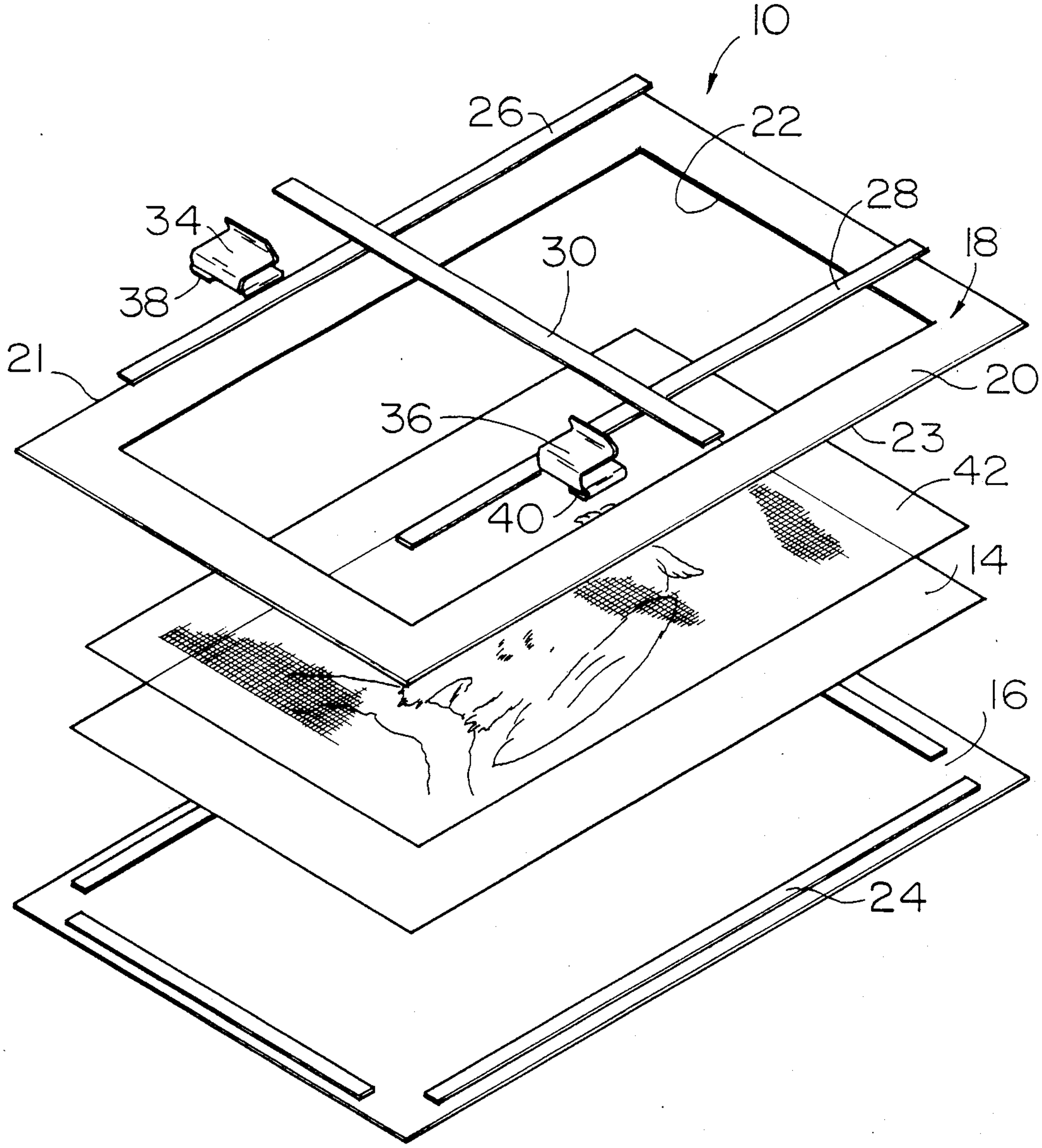
FIG. 2 is an exploded perspective view of the embodiment of FIG. 1.

FIGS. 1 and 2 illustrate a needlework guide device 10 for aiding in the scaled reproduction of pictorial images in needlework. The image of a bird 12 on a photograph 14 is exemplary of the type of image which can be reproduced using the needlework guide 10.

The needlework guide 10 employs a flat, rectangular backing sheet 16 of galvanized steel, approximately one thirty-second of an inch in thickness. A rectangular frame 18, congruent to the backing sheeet 16, is also formed from the same stock of galvanized steel and includes a peripheral border 20 which surrounds a rectangular window 22 therein. The backing sheet 16 and the frame 18 are both formed of a magnetic material. That is, they are both capable of being attracted by a magnet. Magnetic fastening means, in the form of thin, flexible magnetic strips 24 are employed to hold the frame 18 on the backing sheet 16. The magnetic strips 24 may, for example, be formed of a hard urethane base impregnated with magnetized particles of iron oxide which will magnetically attract ferrous metal, such as the galvanized steel backing 16 and the frame 18. The magnetic strips 24 are interposed between the border 20 of the frame 18 and the backing sheet 16 to hold the frame 18 pressed against the backing sheet 16. The magnetic strips 24 may be secured by adhesive to either the underside of the border 20 of the frame 18 or to the periphery of the backing sheet 16 parallel to the edges thereof. Alternatively, the magnetic strips 24 may be structures separate from both the backing sheet 16 and the frame 18.

Figure 3:
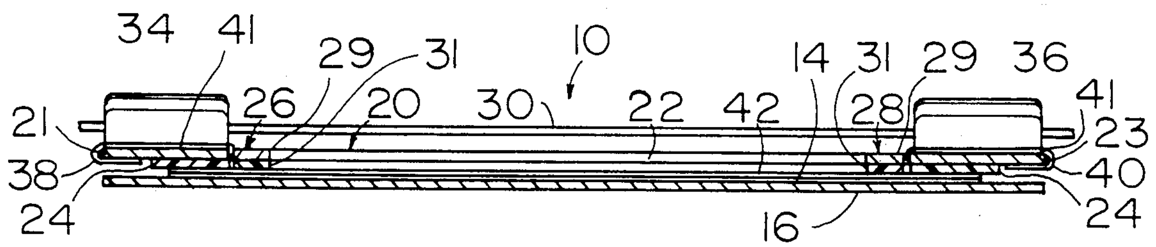
FIG. 3 is a sectional view taken along the lines 3—3 of FIG. 1.

The device 10 also includes a pair of ordinate or vertical scales 26 and 28 for mounting along opposite sides of the window 22. As best illustrated in FIG. 1, the ordinate scales 26 and 28 of the embodiment of the needlework guide 10 depicted contain graduations and indicia in the form of the printed numbers 1 through 80 spaced a uniform distance apart. The distance between the sequential numbers is at a selected scale coresponding to a desired size of reproduction of the bird 12 in needlework. For example, the numbers may be spaced one eighth of an inch apart. The numbers of the ordinate scales 26 and 28 are printed on a layer of paper 29 which is secured by adhesive to narrow magnetic strips 31, similar to the magnetic strips 24, as illustrated in FIG. 3.

The device 10 also includes an abscissa or horizontal scale 30, adapted for mounting on the frame 18 in orthogonal disposition relative to the ordinate scales 26 and 28, also as best depicted in FIG. 1. The abscissa scale 30 is marked at its center at 32 and contains duplicate sets of graduations and indicia, in the form of number sequences, spaced the same distance apart as the numbers on the ordinate scales 26 and 28. The number sequence on the half of the scale to the left of the center marking 32 increases from the center toward the left, while the number sequence on the half of the scale to the right of the center marking 32 ascends in the opposite direction from left to right. The abscissa scale 30 is held in position on the border 20 of the frame 18 by a pair of clips 34 and 36. The clips 34 and 36 support the abscissa scale 30 at both ends on both sides of the center marker 32. The clips 34 and 36 are also formed of thin, galvanized steel and both define generally U-shaped channels to receive the ends of the abscissa scale 30. The left-hand clip 34 includes a flange 38 that is turned over at the left-most extremity to receive the left peripheral edge 21 of the border 20 in the margin thereof exteriorally from the magnetic strip 24 parallel thereto. Likewise, the right-hand bracket 36 has a flange 40 turned over to receive the opposite, right peripheral edge 23 of the border 20 that is located outwardly from the adjacent magnetic strip 24. The back sides of both of the clips 34 and 36 include rectangular, flat magnets 41, as illustrated in FIG. 3. The magnets 41 are bonded by adhesive to the backs of the clips 34 and 36. The clips 34 and 36 can thereby be moved along the opposite side edges 21 and 23 of the border 20 with the flanges 38 and 40, respectively, traveling along the edges 21 and 23. The brackets 34 and 36 are releasably, magnetically attached to the frame 18 at a selected level relative to the ordinate scales 26 and 28.

A transparent overlay 42, formed, for example, of mylar, has a rectilinear grid, depicted in FIG. 1, defined thereon. The grid is formed by orthogonal vertical lines 46 and horizontal lines 48, spaced uniformly apart the same distance as the graduations and the numerical indicia on the scales 26, 28 and 30. The scales 26, 28 and 30 each include graduations and numeric indicia uniformly separated at one eighth inch intervals.

Figure 5:
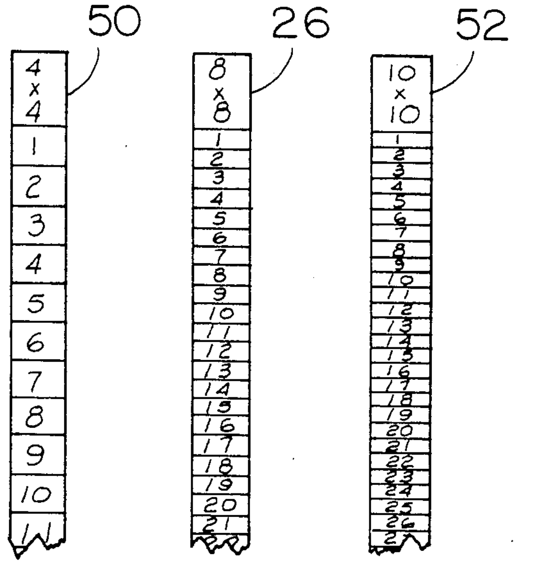
FIG. 5 illustrates, in enlarged detail, portions of several alternative vertical, ordinate scales useful in the embodiment of FIG. 1.

According to a preferred form of the invention, the device 10 is provided with a plurality of sets of ordinate and abscissa scales in which the graduations on the scales in each set are spaced uniformly apart and at the same scale of reproduction. The graduation on the scales in different sets are spaced apart different distances to correspond to different scales of reproduction. In FIG. 5 the scale 26 is illustrated in the center, with scales 50 and 52, belonging to different sets of scales, on either side. The scale 26 includes graduations and numeric indicia spaced apart at one eighth inch intervals. Likewise, the spacing of the graduations and numbers on the abscissa scale 30 are also spaced apart at one eighth inch inervals. The lines 46 on the overlay 42, associated with the scales 26, 28 and 30 are also spaced one eighth inch apart, as are the lines 48 on the overlay 42. The rectilinear grid defined on the overlay 42 thereby defines eight vertical and eight horizontal graduations per inch. That is, the lines 46 and 48 define 64 discrete squares per square inch on the overlay 42.

Figure 4:
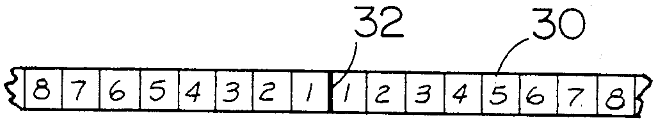
FIG. 4 is an enlarged detail of a portion of a horizontal, abscissa scale useful in the embodiment of FIG. 1.

The graduations on the ordinate scales 26 and 28 are numeric designations corresponding to weft strands in a needlework piece in which the model of the bird 12 is to be reproduced, and the numeric sequences on the abscissa scale 30 are numeric designations corresponding to warp strands. With reference to FIGS. 1 and 4, the center marking 32 corresponds to the center of the warp bar of a typical weaving loom. In many conventional looms, the bobbins on either side of the center of the warp bar are numbered in mirror image fashion, corresponding to the numbering system employed on the abscissa scale 30.

The spatial separations between the sequential numbers in the ordinate scale 50 is twice as great as the distance of separation in the ordinate scale 26. Since each numeric indicia in the scale corresponds to a strand in the needlework, the scale 50 is used to reproduce an image in needlework one half the size of the image produced using the scale 26. Since the spatial separation between adjacent numbers in the scale 50 is twice that of the scale 26, the scale 50 will cover only one half of the weft strands covered by the scale 26. Consequently, the reproduction of the model 12 in needlework using the set of scales including the scale 50 will be one half the size of that which is reproduced using the scales 26, 28 and 30. When the scale 50 having four graduations per inch is employed in the needlework guide 10 as an ordinate scale, a corresponding abscissa scale likewise having four graduations per inch is employed as the horizontal scale in place of the scale 30. Also, a corresponding transparent overlay with orthogonal lines delineating only 16 discrete squares per square inch should be employed with the scale 50.

To produce an image of the model 12 larger than that produced with the scale 26, an ordinate scale having smaller spatial separations, such as the scale 52 may be employed. The ordinate scale 52 has ten graduations and indicia per inch. Accordingly, a set of ordinate and abscissa scales, and a corresponding overlay of ten graduations per inch will result in a reproduction of the model 12 which is 25% larger than that effectuated through use of the ordinate scales 26 and 28, the abscissa scale 30 and the overlay 42.

Figure 6:
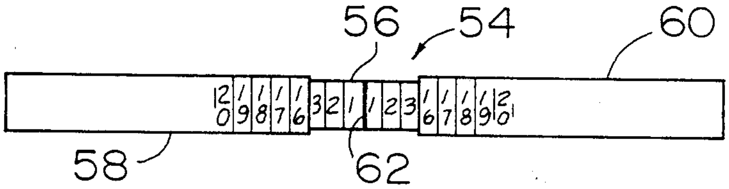
FIG. 6 is a top plan view illustrating a telescoping horizontal, abscissa scale in a collapsed position.
Figure 7:
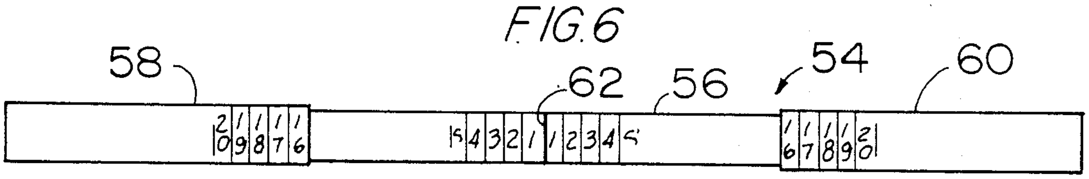
FIG. 7 is a top plan view of the horizontal abscissa scale of FIG. 6 shown extended.
Figure 8:
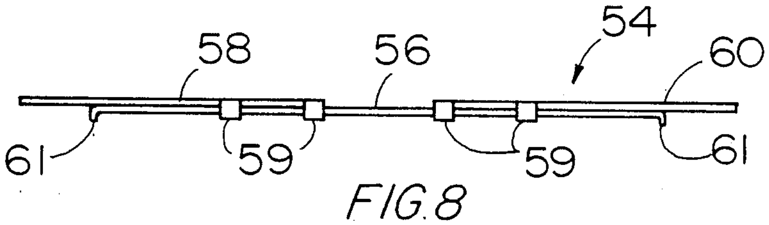
FIG. 8 is a side elevational view of the telscoping abscissa scale of FIG. 6.

The same scales may be used with frames and backing sheets of different sizes. Accordingly, telescoping abscissa scales may be employed to advantage so that the ends of the abscissa scale do not protrude excessively beyond the lateral edges 21 and 23 of the frame 18. FIGS. 6 through 8 illustrate a telescoping abscissa scale 54. The scale 54 employs a central section member 56 which is telescopically received within end section members 58 and 60. The end members 58 and 60 each include a pair of brackets 59 which prohibit lateral movement relative to the central member 56. The ends of the central member 56 are turned down to form stops 61 to limit longitudinal extension of the scale 54.

The spatial separation between the graduations and the indicia is the same in all of the sections 56, 58 and 60 of the abscissa scale 54. In both of the members 58 and 60, the innermost indicia is the number "16". To shorten the abscissa scale 54 in the manner depicted in FIGS. 6 and 8, the innermost indicia of the scale members 58 and 60 is positioned directly upon the two indicia numbered "6" on the central member 56. This reduces by ten the numeric quantity of indicia in each of the ascending number sequences on both sides of the central marking 62 of the central member 56. By telescoping the sections 58 and 60 inwardly toward each other in the manner depicted in FIGS. 6 and 8 the overall length of the abscissa scale 54 is shortened so that the ends of the abscissa scale 54 do not project unduly far beyond the lateral edges 21 and 23 of a small frame. The scale 54 is thus less likely to become accidently dislodged from its clips 34 and 36. When the scale 54 is telescopically contracted, the artisan must remain cognizant of the jump in members between the central member 56 and the end members 58 and 60.

Where the width of the frame demands, however, the end members 58 and 60 are drawn outwardly apart from each other and away from the center marking 62 of the central member 56 in the manner depicted in FIG. 7. The extended length of the telescoping sections by the extension of the members 58 and 60 will then allow the abscissa scale 54 to extend across the entire width of a frame 18 in which a two dimensional model is mounted.

The manner of utilization of the needlework guide may be best described with reference to FIGS. 1 and 2. To use the device, the magnetic strips 24, if separate pieces, are first placed near the marginal edges of either the backing sheet 16, or the frame 18 facing toward the other of those structural elements. As illustrated in FIG. 2, the magnetic strips 24 have been placed atop the backing sheet 16 interiorally of and parallel to the lateral edges thereof. Next, the photograph 14 is positioned face up against the backing sheet 16. The transparent overlay 42 is then placed atop the photograph 14 so that the rectilinear grid defined by the lines 46 and 48 is superimposed upon the photograph 14 and the model 12 is visible therethrough. The frame 18 is then mounted congruently atop the backing sheet 16 and is pulled thereto by the magnetic strips 24, thus entrapping and immobilizing the photograph 14 and the overlay 42 between the border 20 of the frame 18 and the backing sheet 16.

The vertical scales 26 and 28 are then positioned at the lateral edges of the window 22, as depicted in FIG. 1. By employing a pair of ordinate scales 26 and 28 having uniformly separated graduations, but with indicia thereon ascending in opposite directions from one end to the other of each of the scales 26 and 28, it is possible to commence the needlework beginning at either the top or the bottom of the photograph 14.

The clips 34 and 36 are then placed on the border 20 proximate the lateral edges 21 and 23 thereof. The clips 34 and 36 are located vertically along the ordinate scales 26 and 28 at the location therealong at which the needlework is to commence. The ends of the abscissa scale 30 are then positioned in the channels defined by the clips 34 and 36 and the abscissa scale 30 is laterally adjusted so that the center marking 32 is in vertical alignment with center markings 64 and 66 at the top and bottom of the border 20. The center markings 64 and 66 effectively bifurcate the window 22 into equal left and right halves. Once the center marking 32 of the scale 30 has been aligned with either the marking 64 or the marking 66, the user notes the indicia on the scale 30 adjacent to the edges 21 and 23 of the frame 18. Both indicia should be the same, since the abscissa scale 30 includes duplicate number sequences ascending in opposite directions from the center marking 32. The user can maintain the abscissa scale 30 centered relative to the window 22 by making sure that the same indicia on the abscissa scale 30 are always aligned with the lateral edges 21 and 23 of the frame 18.

In producing an image of the bird 12 in needlepoint, the artisan is provided with a ready reference in terms of coordinates on the rectilinear matrix delineated on the overlay 42. For example, if the right leg of the bird 12 is to be yellow in color, and the background therebehind and to the left is to be blue, the yarn on bobbins 2 through 5 on the left side of a weaving loom should be yellow. The yarn on bobbin number 6, and all sequential bobbins to the left should be blue at the weft position at which the abscissa scale 30 is located relative to the ordinate scales 26 and 28 as depicted in FIG. 1. Weft yarns of corresponding color should then be woven through the warp yarns defined by the indicia on the abscissa scale 30.

The coordination of colored yarns is continued as the abscissa scale 30 is moved longitudinally along the ordinate scales 26 and 28 from one end of the frame to the other. The user is relieved from the requirement for tediously counting and recounting intervals in the rectilinear matrix on the overlay 42 corresponding to weft and warp strands in the needlework, since the indicia on the abscissa and ordinate scales 30, 26 and 28 continuously provide ready coordinate positions. The artisan is thus able to simply relate the numbers appearing in the number sequences on these scales to specific weft and warp threads in the needlework.

Undoubtedly, numerous variations and modifications to the embodiment of the invention depicted and described will become readily apparent to those familiar with needlework. For example, it is to be understood that the magnetic strips 24 can be located either in direct contact with the top surface of the backing sheet 16, or the undersurface of the frame 18. Alternatively, the magnetic strips 24 can even be located between the model 14 and the transparent overlay 42. All that is necessary is for the magnetic strips 24 to be interposed between the supporting backing sheet 16 and the frame 18 so as to cause these two elements to be pressed toward each other by the force of magnetic attraction.

Also, while a transparent overlay 42 has been employed in the application of the invention depicted and described, the invention may be used with equal utility to reproduce drawings and images which are printed directly upon graph paper. While the image is produced on graph paper, no overlay is necessary since the rectilinear grid defined on the graph paper will be aligned with the indicia on the corresponding ordinate and abscissa scales employed. The invention is therefore not limited to the specific embodiment and implementation of the invention depicted and described, but rather is defined in the claims appended hereto.

I claim:

1. In a device for facilitating the reproduction of a pictorial image in needlework the improvement comprising: a flat, magnetic sheet forming a backing for an image to be reproduced, a flat, magnetic frame including a border which defines a central, rectangular window therewithin, magnet means for magnetically holding said frame on said backing, a plurality of sets of vertical and horizontal scales in which the graduations on said scales in each set are spaced uniformly apart and are at a desired scale of reproduction of said image in a needlework piece in which said image is to be reproduced in needlework and the graduations on scales in different sets are spaced apart different distances to correspond to different desired sacles of reproduction, wherein said graduations of said vertical scales correspond to weft strands in said needlework piece and said graduations on said horizontal scales correspond to warp strands in said needlework piece and said horizontal scales are moveable along said vertical scales whereby the longitudinal position of said horizontal scales relative to said vertical scales marks a weft strand to be knitted and said vertical scales are adapted for mounting at a side of said window, and said horizontal scales each have a center marker and mirror image sets of graduations ascending in both directions from said center marker, and said scales include numeric indicia on both said vertical and horizontal scales and said indicia on said vertical scales increase from one and to another to identify corresponding weft strands in said workpiece and said indicia on said horizontal scales are duplicate number sequences ascending in opposite directions from said center marker and said numeric indicia correspond to coordinate positions in terms of weft and warp strands in said needlework piece.

2. A device according to claim 1 in which each of said sets includes a pair of vertical scales, and one vertical scale in each pair includes graduations ascending from top to bottom and the other vertical scale in each pair includes graduations ascending from bottom to top.

3. A device according to claim 1 further comprising a pair of clips for holding said horizontal scale on both sides of said center marker and said clips have magnets for releasable magnetic attachment to said frame at a selected level relative to said vertical scale.

4. A device according to claim 1 further characterized in that said magnet means is comprised of a plurality of magnetic strips permanently affixed to one of said sheet and said frame and facing the other of said sheet and said frame.

5. A device according to claim 1 further comprising a transparent overlay having a rectilinear grid defined thereon and formed by orthogonal lines spaced uniformly apart the same distance as said graduations.

6. In a needlework guide for aiding in the scaled reproduction of a pictoral image in needlework the improvement comprising: a flat, magnetic support, a flat magnetic frame having a border defining a central rectangular window therewithin, magnet means for magnetically holding said frame and said support together, a plurality of sets of scales, each set having ordinate and abscissa scales with graduations thereon, wherein said graduations of said scales in each set are spaced at uniform intervals and said graduations in different sets are spaced at different intervals, wherein the spacing of graduations in each of said sets corresponds to a desired scale of reproduction of said image in a needlework piece in which said image is to be reproduced in needlework, and said ordinate scales are adapted for positioning along a side of said opening and have numeric indicia thereon ascending from one end to another and said abscissa scales are adapted for positioning perpendicular to said ordinate scales and said abscissa scales each have a central marking thereon and contain graduations and duplicate sets of numeric indicia ascending in opposite directions from said central marking and said graduations on said ordinate scales correspond to weft strands in said needlework piece and said graduations on said abscissa scales correspond to warp strands in said needlework piece, and said numeric indicia on said ordinate and abscissa scales correspond to coordinate positions in terms of said weft and warp strands in said needlework piece.

7. A needlework guide according to claim 6 further comprising a transparent overlay for each of said sets of scales having a rectilinear grid thereon with orthogonal lines spaced at the same uniform interval as the graduations in the set of scales associated therewith.

8. A needlework guide according to claim 6 further comprising a pair of ordinate scales with uniformly separated graduations and indicia thereon ascending in opposite directions from one end of each ordinate scale to the other.

9. A needlework guide according to claim 6 wherein said frame and said support are formed of sheet steel and said magnet means is comprised of strips of flat, magnetized stock interposed between said support and said frame.

10. A needlework guide according to claim 6 further comprising a pair of clips bearing magnets thereon for magnetic attachment to said frame for holding said abscissa scale on both sides of said central marking at a selected location along said ordinate scale.

11. In a device for aiding in the reproduction of pictorial images in needlework the improvement comprising: a backing sheet formed of magnetic material, a magnetic frame congruent to said backing sheet and including a border surrounding a rectangular window therein, magnetized fastening means for holding said frame pressed against said backing sheet, a plurality of different ordinate scales having graduations and numeric indicia thereon ascending from one and to another and spaced at different selected desired scales of reproduction of said image in a needlework piece in which said image is to be reproduced in needlework, and a plurality of different abscissa scales having graduations and indicia thereon spaced at the same desired scales of reproduction as said ordinate scales, and said ordinate scales are adapted for mounting along a side of said window and said abscissa scales are adapted for mounting on said frame orthogonally relative to said ordinate scales, and said abscissa scales each have a center and contain duplicate sets of numeric indicia ascending in opposite directions from said center and said graduations on said ordinate scales correspond to weft strands in said needlework piece and said graduations on said abscissa scales correspond to warp strands in said needleework piece, and said numeric indicia on said ordinate and abscissa scales correspond to coordinate positions in terms of said weft and warp strands in said needlework piece.

12. A device according to claim 11 in which said ordinate scale includes graduations spaced an equal distance apart and said indicia on said ordinate scale are numeric designations corresponding to weft strands and said abscissa scale includes graduations spaced apart at said same distance and said indicia on said abscissa scale are numeric designations corresponding to warp strands.

13. A device according to claim 11 in which said abscissa scale is comprised of telescoping sections.

14. A device according to claim 11 in which said ordinate scale is equipped with magnetized means for selective magnetic attachment to said frame and said backing sheet.

* * * * *